(12) United States Patent
Pournazeri et al.

(10) Patent No.: US 12,374,172 B2
(45) Date of Patent: Jul. 29, 2025

(54) METHOD AND SYSTEM FOR DOWNFORCE ESTIMATION USING A HALF-CAR MODEL WITH A DATA DRIVEN UNCERTAINTIES ESTIMATOR

(71) Applicant: GM Global Technology Operations LLC, Detroit, MI (US)

(72) Inventors: Mohammad Pournazeri, Etobicoke (CA); Naser Mehrabi, Richmond Hill (CA); Ehsan Asadi, Markham (CA); SeyedAlireza Kasaiezadeh Mahabadi, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 18/350,491

(22) Filed: Jul. 11, 2023

(65) Prior Publication Data
US 2025/0022324 A1    Jan. 16, 2025

(51) Int. Cl.
*G07C 5/02* (2006.01)
*B62D 35/00* (2006.01)

(52) U.S. Cl.
CPC ............. *G07C 5/02* (2013.01); *B62D 35/005* (2013.01); *B62D 35/007* (2013.01)

(58) Field of Classification Search
CPC ...... G07C 5/02; B62D 35/005; B62D 35/007; B62D 37/02
See application file for complete search history.

(56) References Cited

U.S. PATENT DOCUMENTS

| | | | | |
|---|---|---|---|---|
| 4,810,022 A | * | 3/1989 | Takagi | B62D 35/005 |
| | | | | 296/180.5 |
| 5,090,766 A | * | 2/1992 | Ito | B62D 37/02 |
| | | | | 296/180.5 |
| 2007/0156315 A1 | * | 7/2007 | Raab | B60T 8/17551 |
| | | | | 701/1 |

(Continued)

OTHER PUBLICATIONS

D. Papagiannis, E. Tsioumas, M. Koseoglou, N. Jabbour and C. Mademlis, "Enhancing the Braking Performance of a Vehicle Through the Proper Control of the Active Suspension System," in IEEE Access, vol. 9, pp. 155936-155948, 2021, doi: 10.1109/ACCESS.2021.3129263. (Year: 2021).*

(Continued)

*Primary Examiner* — Jelani A Smith
*Assistant Examiner* — Alyssa Rorie
(74) *Attorney, Agent, or Firm* — Vivacqua Crane, PLLC

(57) ABSTRACT

A method for downforce control includes receiving a plurality of vehicle inputs from a vehicle. The plurality of vehicle inputs includes sensor data from a plurality of sensors of the vehicle. The method further includes determining a downforce acting on the vehicle, by: (a) determining a predicted half-car model uncertainties using a neural network; and (b) determining a front normal force at the front axle and a rear normal force at the rear axle using the vehicle inputs, the predicted half-car model uncertainties, and a half-car model. The method further includes determining a first position of the first aerodynamic body relative to the vehicle body and a second position of the second aerodynamic body relative to the vehicle body based on the front normal force at the front axle and a rear normal force at the rear axle, respectively.

20 Claims, 2 Drawing Sheets

(56) References Cited

U.S. PATENT DOCUMENTS

| | | | |
|---|---|---|---|
| 2022/0348212 A1* | 11/2022 | Hars | G01C 21/20 |
| 2023/0038657 A1* | 2/2023 | Bartels | B62D 35/005 |
| 2023/0039754 A1* | 2/2023 | Bartels | B62D 37/02 |
| 2023/0399063 A1* | 12/2023 | Šoštaric et al. | B62D 35/007 |

OTHER PUBLICATIONS

J. Cao, H. Liu, P. Li and D. J. Brown, "State of the Art in Vehicle Active Suspension Adaptive Control Systems Based on Intelligent Methodologies," in IEEE Transactions on Intelligent Transportation Systems, vol. 9, No. 3, pp. 392-405, Sep. 2008, doi: 10.1109/TITS. 2008.928244. (Year: 2008).*

Yingmin Jia, "Robust control with decoupling performance for steering and traction of 4WS vehicles under velocity-varying motion," in IEEE Transactions on Control Systems Technology, vol. 8, No. 3, pp. 554-569, May 2000, doi: 10.1109/87.845885. (Year: 2000).*

* cited by examiner

METHOD AND SYSTEM FOR DOWNFORCE ESTIMATION USING A HALF-CAR MODEL WITH A DATA DRIVEN UNCERTAINTIES ESTIMATOR

The present disclosure relates to methods and systems for downforce estimation using the half-car model with data driven uncertainties estimator.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Downforce refers to the vertical load created by a vehicle's aerodynamic parts during motion. Some vehicles include actuators for controlling the downforce.

SUMMARY

The present disclosure relates to a method for downforce control. In an aspect of the present disclosure, method includes receiving a plurality of vehicle inputs from a vehicle. The vehicle inputs include sensor data from the sensors of the vehicle. The vehicle inputs may include a longitudinal velocity of the vehicle, a lateral acceleration of the vehicle, and a longitudinal acceleration of the vehicle. The vehicle includes a vehicle body, a front axle coupled to the vehicle body, a rear axle coupled to the vehicle body, a first aerodynamic actuator coupled to the vehicle body, and a second aerodynamic actuator coupled to the vehicle body. The first aerodynamic actuator includes a first aerodynamic body movable relative to the vehicle body. The second aerodynamic actuator includes a second aerodynamic body movable relative to the vehicle body. The method also includes determining a downforce acting on the vehicle. Determining the downforce acting on the vehicle includes: determining a predicted half-car model uncertainties using a neural network and determining a front normal force at the front axle and a rear normal force at the rear axle using the vehicle inputs, the predicted half-car model uncertainties, and a half-car model. The method also includes determining a first position of the first aerodynamic body relative to the vehicle body and a second position of the second aerodynamic body relative to the vehicle body based on the front normal force at the front axle and a rear normal force at the rear axle, respectively. The method also includes commanding the first aerodynamic actuator to move the first aerodynamic body to the first position relative to the vehicle body. The method also includes commanding the second aerodynamic actuator to move the second aerodynamic body to the second position relative to the vehicle body.

In an aspect of the present disclosure, the half-car model includes the following equations:

$$M(\ddot{z}+g) = \left(F_{sp}^f + F_{f,uncertainties}\right) + \left(F_{sp}^r + F_{r,uncertainties}\right) - F_{zaero}^f - F_{zaero}^r$$

$$I_{yy}\ddot{\theta} = L_f\left(F_{sp}^f + F_{f,uncertainties}\right) - L_r\left(F_{sp}^r + F_{r,uncertainties}\right) - L_{DF}^f F_{zaero}^f + L_{DF}^r F_{zaero}^r - Mh_{pc,cg}a_x$$

where:
M is a mass of the vehicle;
g is a universal gravitational constant;
$\ddot{z}$ is a rate of change of a rate of change of the heave of the vehicle;
$F_{sp}^f$ is the front spring-based normal force at the front axle;
$F_{r,uncertanties}$ is car model uncertainties force at the rear axle;
$F_{sp}^r$ is the rear spring-based normal force at the rear axle;
$F_{f,uncertainties}$ is the half-car model uncertainties force at the front axle;
$F_{zaero}^f$ is the front downforce;
$F_{zaero}^r$ is the rear downforce;
$I_{yy}$ is the inertia of the vehicle;
$\ddot{\theta}$ is a rate of change of a rate of change of the pitch angle;
$L_f$ is the distance from the center of gravity of the vehicle to the front axle;
$L_r$ is the distance from the center of gravity of the vehicle to the rear axle;
$L_{DF}^r$ is the distance from the center of gravity of the vehicle to the first aerodynamic body;
$L_{DF}^f$ is the distance from the center of gravity of the vehicle to the second aerodynamic body;
$h_{pc,cg}$ is the road height; and
$a_x$ is the longitudinal acceleration of the vehicle.

In an aspect of the present disclosure, the half-car model further includes the following equations:

$$F_{sp}^f = F_{f_0} + K_f z_f + C_f \dot{z}_f$$

$$F_{sp}^r = F_{r_0} + K_r z_r + C_r \dot{z}_r$$

where:
$F_{sp}^f$ is the front spring-based normal force at the front axle;
$F_{sp}^r$ is the rear spring-based normal force at the rear axle;
$F_{f_0}$ is the front preload;
$F_{r_0}$ is the rear preload;
$K_f$ is the spring constant of the suspension in the front axle;
$K_r$ is the spring constant of the suspension in the rear axle;
$z_f$ is the heave at the front axle;
$z_r$ is the heave at the rear axle;
$C_f$ is the front suspension damping rate;
$C_r$ is the rear suspension damping rate;
$\dot{z}_f$ is a rate of change of a heave at the front axle; and
$\dot{z}_r$ is a rate of change of a heave at the rear axle.

The method further includes using a Kalman filter to determine the downforce acting on the vehicle. Also, the method further includes developing the neural network to determine the half-car model uncertainties force at the front axle and the half-car model uncertainties force at the rear axle of the vehicle. The method further includes training the neural network model by simulating the vehicle in a wind tunnel and/or by testing the vehicle on a road.

The present application also describes a tangible, non-transitory, machine-readable medium, including machine-readable instructions. When executed by a processor, the machine-readable instructions cause the processor to execute the method described above.

The present disclosure also describes a vehicle. The vehicle includes a vehicle body, a front axle coupled to the vehicle body, a rear axle coupled to the vehicle body, a plurality of sensors disposed within the vehicle body, and a vehicle controller disposed within the vehicle body. The vehicle controller is in communication with the sensors. The vehicle controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
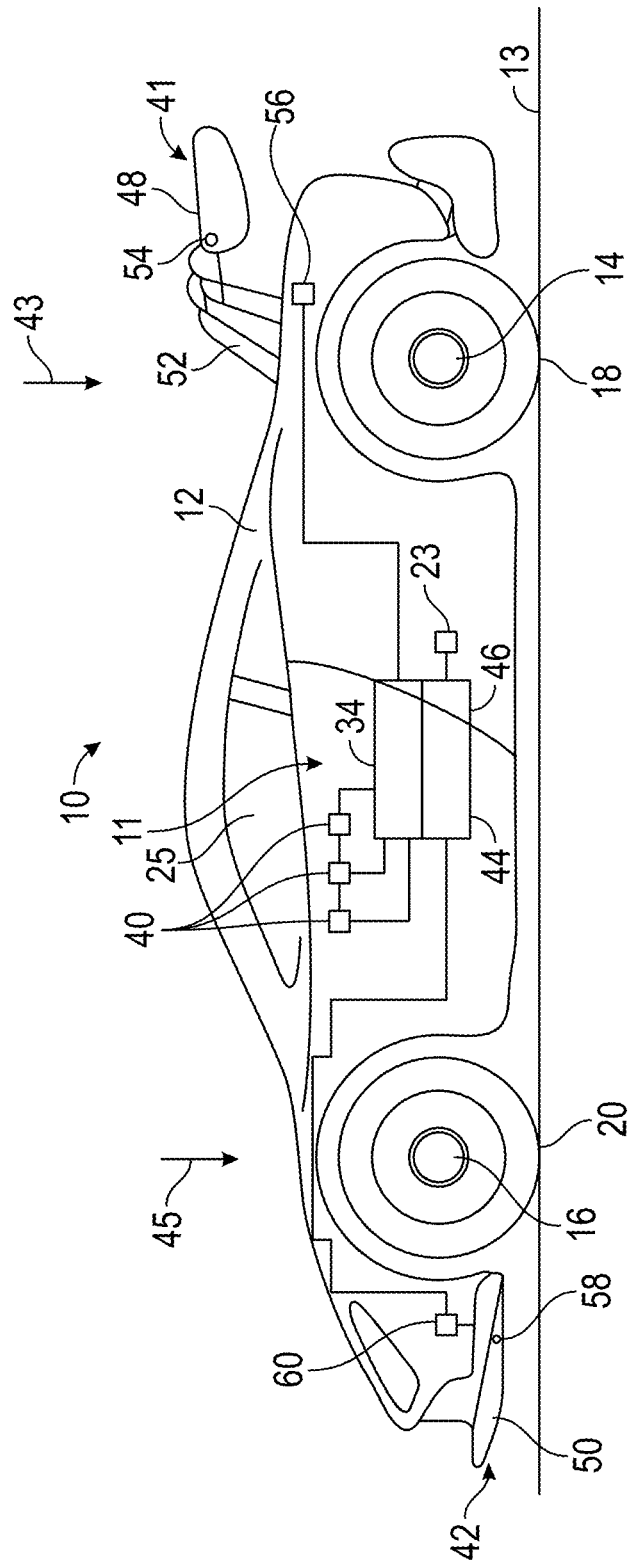
FIG. 1 is a schematic side view of a vehicle including a system for downforce control.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for downforce control. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a coupe, it is envisioned that that vehicle 10 may be another type of vehicle, such as a pickup truck, a sedan, a sport utility vehicle (SUVs), a recreational vehicle (RVs), etc. The system 11 can be used for accurate estimation of downforce applied by active aero actuators. In this system 11, a hybrid half car plus Machine Learning-based delta model is developed to estimate the downforce in real time operation with high reliability. A hybrid half car plus Machine Learning-based delta model is developed to estimate the downforce in real time operation with high reliability. The system 11 calculates the half-car model uncertainties at different operating conditions. The calculated uncertainties is then used as ground truth for machine-learning uncertainty predictor training. A model informed rate limiting min/max logic is used to prevent the machine-learning uncertainty predictor from providing an incorrect downforce estimation. In this system 11, a Kalman filter is designed on a half car model to estimate the front and rear downforces using spring based normal force measurement. Due to simplicity of the half car model, downforce estimation could be not accurate, especially during harsh maneuvers. The system 11 therefore is used to capture the model uncertainties and consequently improve downforce estimation.

Further, the vehicle 10 includes a vehicle controller 34 and one or more sensors 40 in communication with the vehicle controller 34. The sensors 40 collect information and generate sensor data indicative of the collected information. As non-limiting examples, the sensors 40 may include Global Navigation Satellite System (GNSS) transceivers or receivers, inertial measurement unit (IMU), yaw rate sensors, ride height sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ride height sensors are configured to measure the right height of the vehicle 10. The ultrasonic sensor may detect static and/or dynamic objects.

The vehicle controller 34 is programmed to receive sensor data from the sensors 40 and includes at least one processor 44 and a non-transitory computer readable storage device or media 46. The processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the vehicle controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10.

Figure 2:
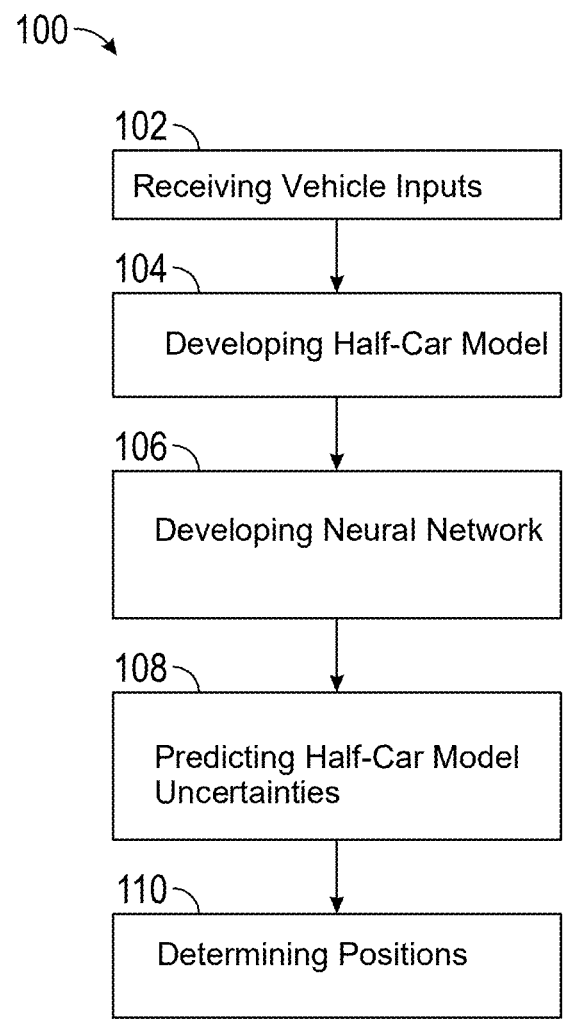
FIG. 2 is a flowchart of a method for downforce control.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators (e.g., first aerodynamic actuator 41 and/or second aerodynamic actuator 42) to automatically control the components of the vehicle 10 based on the logic, calculations, methods, and/or algorithms. Although a single vehicle controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the vehicle controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2).

The vehicle 10 includes a vehicle body 12, a first or rear axle 14, and a second or front axle 16. The front axle 14 and the rear axle 16 are coupled to the vehicle body 12. Further, each of the front axle 14 and the rear axle 16 are configured to rotate relative to the vehicle body 12. The vehicle 10 further includes one or more first or rear tires 18 coupled to the front axle 14 and one or more second or front tires 20 coupled to the rear axle 16.

The vehicle 10 includes a first or rear aerodynamic actuator 41 and a second or front aerodynamic actuator 42 each in communication with the vehicle controller 34. The first aerodynamic actuator 41 includes the first aerodynamic body 48, and the second aerodynamic actuator 42 includes a second aerodynamic body 50. Each of the first aerodynamic body 48 and the second aerodynamic body 50 may be configured as a wing-shaped spoiler. In the present disclosure, the term "wing-shaped" is defined as having a shape of a wing, i.e., a fin having a shape of an airfoil defined by a streamlined cross-sectional shape producing lift for flight or propulsion through a fluid. The term "spoiler" means an aerodynamic device capable of disrupting air movement across the vehicle 10 while the vehicle 10 is in motion, thereby reducing drag and/or inducing an aerodynamic downforce on the vehicle 10. The term "downforce" means a force component that is perpendicular to the direction of relative motion of the vehicle 10, i.e., in the longitudinal direction, toward the road surface 13. For example, the spoiler can diffuse air by increasing the amount of turbulence flowing over it. The first aerodynamic actuator 41 is closer to the front axle 14 than to the rear axle 16 to control a rear downforce 43 at or near the front axle 14. The second aerodynamic actuator 42 is closer to the rear axle 16 than to the front axle 14 to control a front downforce 45 at or near the rear axle 16. The rear downforce 43 and the front downforce 45 may be determined using sensor data from the sensors 40 (e.g., ride height sensors).

The first aerodynamic actuator 41 includes a support 52 directly coupled to the vehicle body 12 and one or more first pivots 54 (e.g., pivot pin, pivot mechanism, etc.) pivotally coupling the first aerodynamic body 48 to the vehicle body 12. Accordingly, the first aerodynamic body 48 is movable (e.g., pivotable) relative to the vehicle body 12. The first aerodynamic actuator 41 includes a first electric motor 56 (or another suitable machine) in communication with the vehicle controller 34 and coupled to the first aerodynamic body 48 through the first pivot 54. The vehicle controller 34 is therefore programmed to actuate the first electric motor 56 to move the first aerodynamic body 48 relative to the vehicle body 12.

The second aerodynamic actuator 42 is coupled to the vehicle body 12 and includes one or more second pivots 58 (e.g., pivot pin, pivot mechanism, etc.) pivotally coupling the second aerodynamic body 50 to the vehicle body 12. Accordingly, the second aerodynamic body 50 is movable (e.g., pivotable) relative to the vehicle body 12. The second aerodynamic actuator 42 includes a second electric motor 60 (or another suitable machine) in communication with the vehicle controller 34 and coupled to the second aerodynamic body 50 through the second pivot 58. The vehicle controller 34 is therefore programmed to actuate the second electric motor 60 to move the second aerodynamic body 50 relative to the vehicle body 12.

The vehicle 10 includes a user interface 23 in communication with the vehicle controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification. The user interface 23 is in electronic communication with the vehicle controller 34 and is configured to receive inputs from the hearing-impaired vehicle occupant 25 (e.g., a vehicle user or a vehicle passenger). For example, the user interface 23 may include a touch screen and/or buttons configured to receive inputs from the vehicle occupant. Accordingly, the vehicle controller 34 is configured to receive inputs from the vehicle occupant via the user interface 23 and to provide an output (e.g., audible, haptic, and/or visible notifications) to the vehicle occupant.

FIG. 2 is a flowchart of an active downforce control method 100 for downforce control. The method 100 begins at block 102. At block 102, the vehicle controller 34 receives vehicle inputs, such as sensor data from the sensors 40, driver inputs, stability triggers, and vehicle feedback. As non-limiting examples, the vehicle controller 34 may receive the vehicle longitudinal acceleration, vehicle lateral acceleration, vehicle longitudinal velocity, right height data, front vehicle angle, brake pedal pressure or position, throttle position, estimated coefficient of friction between the road surface 13 and at least one of the first tires 18 or second tires 20, steering wheel angle, normal force, downforce, pneumatic trail, understeer angle, slip slope, and wheel ground speed. After the vehicle controller 34 receives the inputs, the method 100 continues to block 104.

At block 104, a half-car model is developed that incorporates pitch and heave degrees of freedom, along with an integrated suspension model. The equations of motion for the half-car model may be written in the form of heave and pitch motions. As a non-limiting example, the half-car state space model may be expressed with the following equations:

$$M(\ddot{z}+g) = \left(F_{sp}^f + F_{f,uncertainties}\right) + \left(F_{sp}^r + F_{r,uncertainties}\right) - F_{zaero}^f - F_{zaero}^r \quad \text{Eq. 1}$$

$$I_{yy}\ddot{\theta} = L_f\left(F_{sp}^f + F_{f,uncertainties}\right) - L_r\left(F_{sp}^r + F_{r,uncertainties}\right) - L_{DF}^f F_{zaero}^f + L_{DF}^r F_{zaero}^r - Mh_{pc,cg}a_x \quad \text{Eq. 2}$$

where:
M is the mass of the vehicle 10;
g is the universal gravitational constant;
$\ddot{z}$ is the rate of change of the rate of change of the heave of the vehicle 10;
$F_{sp}^f$ is the front spring-based normal force at the front axle 16;
$F_{r,uncertainties}$ is car model uncertainties force at the rear axle 14;
$F_{sp}^r$ is the rear spring-based normal force at the rear axle 14;
$F_{f,uncertainties}$ is the half-car model uncertainties force at the front axle 16;
$F_{zaero}^f$ is the front downforce;
$F_{zaero}^r$ is the rear downforce;
$I_{yy}$ is the inertia of the vehicle 10;
$\ddot{\theta}$ is the rate of change of the rate of change of the pitch angle;
$L_f$ is the distance from the center of gravity of the vehicle 10 to the front axle;
$L_r$ is the distance from the center of gravity of the vehicle 10 to the rear axle;
$L_{DF}^r$ is the distance from the center of gravity of the vehicle to the first aerodynamic body 48;
$L_{DF}^f$ is the distance from the center of gravity of the vehicle to the second aerodynamic body 50;
$h_{pc,cg}$ is the road height; and
$a_x$ is the longitudinal acceleration of the vehicle 10.

The half-car model further includes the following equations:

$$F_{sp}^f = F_{f_0} + K_f z_f + C_f \dot{z}_f$$

-continued $$F_{sp}^r = F_{r_0} + K_r z_r + C_r \dot{z}_r$$

where:
$F_{sp}^f$ is the front spring-based normal force at the front axle 16;
$F_{sp}^r$ is the rear spring-based normal force at the rear axle 14;
$F_{f_0}$ is the front preload;
$F_{r_0}$ is the rear preload;
$K_f$ is the spring constant of the suspension in the front axle 16;
$K_r$ is the spring constant of the suspension in the rear axle 14;
$z_f$ is the heave at the front axle 16;
$z_r$ is the heave at the rear axle 14;
$C_f$ is the front suspension damping rate;
$C_r$ is the rear suspension damping rate;
$\dot{z}_f$ is the rate of change of the heave at the front axle 16; and
$\dot{z}_r$ is the rate of change of the heave at the rear axle 14.

After developing the half-car model, the method 100 proceeds to block 106. At block 106, a neural network is developed to determine the half-car model uncertainties force at the front axle 16 and the rear axle 14. To do so, data is collected to train the neural network. The training may occur by testing the vehicle 10 on the road and/or by simulating the vehicle 10 in a wind tunnel. To estimate the half-car model uncertainties, several structures (e.g., inputs, number of layers, number of neurons, activation functions) are trained and evaluated. As a non-limiting example, a shallow neural network may be developed. This shallow neural network may include 3 layers. One layer may include fifteen neurons, another layer may include 10 neurons, and a third layer may include two neurons. The inputs of this neural network may include longitudinal velocity, longitudinal acceleration, lateral acceleration, the heave of the vehicle 10 at the front axle 16, the heave of the vehicle 10 at the rear axle 14, the pitch at the front axle 16, and the pitch at the rear axle 14. The output of the neural network is the half-car model uncertainties force at the front axle 16 and the rear axle 14. Then, the selected structure for the neural may be used to train the neural network and make any necessary adjustments to optimize the structure. To train the uncertainty neural network, there is a need for network input data as well as ground truth data (uncertainty loads). To generate the inputs, the ground truth data, several simulations were run using different driving scenarios. Since the amount of downforce is known during those driving scenarios, a Kalman filter may be used to estimate the un-modeled loads for the given inputs. The estimated unmodeled loads may be used as ground truth for the given inputs. An informed rate limiting min/max logic is used to prevent the machine-learning uncertainty predictor from providing an incorrect downforce estimation. The inputs of the informed rate limiting min/max logic may be the ride hide measurements, the longitudinal velocity, and the positions of the first aerodynamic actuator 41 and the second or front aerodynamic actuator 42. In this informed rate limiting min/max logic, an aero map mode is used to determine the downforce at the front axle 16 (i.e., the front downforce) and the downforce at the rear axle 14 (i.e., the rear downforce). The rate of change of the front and rear downforces is calculated. Then, the amount of the front and rear downforces and their rates of change are used to calculate the maximum and minimum front and rear downforces and the maximum and minimum rates of changes for the front and rear downforces. Then, the method 100 continues to block 108.

At block 108, the vehicle controller 34 uses the neural network to predict the half-car model uncertainties at the front axle 16 and the rear axle 16 using the measurements and estimations from the vehicle 10 (e.g., inputs from the vehicle 10, such as sensor data). The predicted half-car model uncertainties are then fed into the half car model used for Kalman filter downforce estimation. The estimated downforce is then passed through rate limiting and min/max logic as described above. The final estimated downforce is then used for downforce control. The method 100 then proceeds to block 110.

At block 110, the vehicle controller 34 determines the positions for the first aerodynamic body 48 and the second aerodynamic body 50 relative to the vehicle body 12 based on the final estimated downforce. The vehicle controller 34 then commands the first aerodynamic actuator 41 to move the first aerodynamic body 48 to the determined position relative to the vehicle body 12. Also, the vehicle controller 34 commands the second aerodynamic actuator 42 to move the second aerodynamic body 50 to the determined position relative to the vehicle body 12.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for downforce control, comprising:
receiving a plurality of vehicle inputs from a vehicle, wherein the plurality of vehicle inputs includes sensor data from a plurality of sensors of the vehicle, the vehicle includes a vehicle body, a front axle coupled to the vehicle body, a rear axle coupled to the vehicle body, a first aerodynamic actuator coupled to the vehicle body, and a second aerodynamic actuator coupled to the vehicle body, the first aerodynamic actuator includes a first aerodynamic body movable relative to the vehicle body, the second aerodynamic actuator includes a second aerodynamic body movable relative to the vehicle body;
determining a downforce acting on the vehicle, wherein determining the downforce acting on the vehicle includes:
determining a predicted half-car model uncertainties using a neural network including a rate limiting min/max logic to prevent an incorrect downforce estimation, the rate limiting min/max logic having rate limiting inputs comprising:
ride height measurements;
longitudinal velocity; and
positions of the first and second aerodynamic actuators;
determining a front normal force at the front axle and a rear normal force at the rear axle using the vehicle inputs, the predicted half-car model uncertainties, and a half-car model;
determining a first position of the first aerodynamic body relative to the vehicle body and a second position of the second aerodynamic body relative to the vehicle body based on the downforce acting on the vehicle;
commanding the first aerodynamic actuator to move the first aerodynamic body to the first position relative to the vehicle body; and
commanding the second aerodynamic actuator to move the second aerodynamic body to the second position relative to the vehicle body.

2. The method of claim 1, wherein the half-car model includes a following equations:

$$M(\ddot{z}+g) = \left(F_{sp}^f + F_{f,uncertainties}\right) + \left(F_{sp}^r + F_{r,uncertainties}\right) - F_{zaero}^f - F_{zaero}^r$$

$$I_{yy}\ddot{\theta} = L_f\left(F_{sp}^f + F_{f,uncertainties}\right) -$$
$$L_r\left(F_{sp}^r + F_{r,uncertainties}\right) - L_{DF}^f F_{zaero}^f + L_{DF}^r F_{zaero}^r - Mh_{pc,cg}a_x$$

where:
M is a mass of the vehicle;
g is a universal gravitational constant;
$\ddot{z}$ is a rate of change of a rate of change of a heave of the vehicle;
$F_{sp}^f$ is a front spring-based normal force at the front axle;
$F_{r,uncertanties}$ is car model uncertainties force at the rear axle;
$F_{sp}^r$ is a rear spring-based normal force at the rear axle;
$F_{f,uncertainties}$ is the half-car model uncertainties force at the front axle;
$F_{zaero}^f$ is a front downforce;
$F_{zaero}^r$ is a rear downforce;
$I_{yy}$ is a inertia of the vehicle;
$\ddot{\theta}$ is a rate of change of a rate of change of a pitch angle;
$L_f$ is a distance from a center of gravity of the vehicle to the front axle;
$L_r$ is a distance from the center of gravity of the vehicle to the rear axle;
$L_{DF}^r$ is a distance from the center of gravity of the vehicle to the first aerodynamic body;
$L_{DF}^f$ is a distance from the center of gravity of the vehicle to the second aerodynamic body;
$h_{pc,cg}$ is a road height; and
$a_x$ is a longitudinal acceleration of the vehicle.

3. The method of claim 2, wherein the half-car mode further uses a following equations:

$$F_{sp}^f = F_{f_0} + K_f z_f + C_f \dot{z}_f$$

$$F_{sp}^r = F_{r_0} + K_r z_r + C_r \dot{z}_r$$

where:
$F_{sp}^f$ is the front spring-based normal force at the front axle;
$F_{sp}^r$ is the rear spring-based normal force at the rear axle;
$F_{f_0}$ is a front preload;
$F_{r_0}$ is a rear preload;
$K_f$ is a spring constant of a suspension in the front axle;

$K_r$ is a spring constant of a suspension in the rear axle;
$z_f$ is a heave at the front axle;
$z_r$ is a heave at the rear axle;
$C_f$ is a front suspension damping rate;
$C_r$ is a rear suspension damping rate;
$\dot{z}_f$ is a rate of change of the heave at the front axle; and
$\dot{z}_r$ is a rate of change of the heave at the rear axle.

4. The method of claim 3, further comprising using a Kalman filter to determine the downforce acting on the vehicle.

5. The method of claim 4, further comprising developing the neural network to determine the half-car model uncertainties force at the front axle and the half-car model uncertainties force at the rear axle of the vehicle.

6. The method of claim 4, further comprising training the neural network model by simulating the vehicle in a wind tunnel.

7. The method of claim 5, further comprising training the neural network model by testing the vehicle on a road.

8. The method of claim 6, wherein the vehicle inputs include a longitudinal velocity of the vehicle, a lateral acceleration of the vehicle, and a longitudinal acceleration of the vehicle.

9. A tangible, non-transitory, machine-readable medium, comprising machine-readable instructions, that when executed by a processor, cause the processor to:
receive a plurality of vehicle inputs from a vehicle, wherein the plurality of vehicle inputs includes sensor data from a plurality of sensors of the vehicle, the vehicle includes a vehicle body, a front axle coupled to the vehicle body, a rear axle coupled to the vehicle body, a first aerodynamic actuator coupled to the vehicle body, and a second aerodynamic actuator coupled to the vehicle body, the first aerodynamic actuator includes a first aerodynamic body movable relative to the vehicle body, the second aerodynamic actuator includes a second aerodynamic body movable relative to the vehicle body;
determine a downforce acting on the vehicle, wherein determining the downforce acting on the vehicle includes:
determine a predicted half-car model uncertainties using a neural network including a rate limiting min/max logic to prevent an incorrect downforce estimation, the rate limiting min/max logic having rate limiting inputs comprising:
ride height measurements;
longitudinal velocity; and
positions of the first and second aerodynamic actuators;
determine a front normal force at the front axle and a rear normal force at the rear axle using the vehicle inputs, the predicted half-car model uncertainties, and a half-car model;
determine a first position of the first aerodynamic body relative to the vehicle body and a second position of the second aerodynamic body relative to the vehicle body based on the downforce acting on the vehicle;
command the first aerodynamic actuator to move the first aerodynamic body to the first position relative to the vehicle body; and
command the second aerodynamic actuator to move the second aerodynamic body to the second position relative to the vehicle body.

10. The tangible, non-transitory, machine-readable medium of claim 9, wherein the half-car model includes a following equations:

$$M(\ddot{z}+g) = \left(F_{sp}^f + F_{f,uncertainties}\right) + \left(F_{sp}^r + F_{r,uncertainties}\right) - F_{zaero}^f - F_{zaero}^r$$

$$I_{yy}\ddot{\theta} = L_f\left(F_{sp}^f + F_{f,uncertainties}\right) -$$
$$L_r\left(F_{sp}^r + F_{r,uncertainties}\right) - L_{DF}^f F_{zaero}^f + L_{DF}^r F_{zaero}^r - Mh_{pc,cg}a_x$$

where:
M is a mass of the vehicle;
g is a universal gravitational constant;
$\ddot{z}$ is a rate of change of a rate of change of a heave of the vehicle;
$F_{sp}^f$ is a front spring-based normal force at the front axle;
$F_{f,uncertainties}$ is half-car model uncertainties force at the rear axle;
$F_{sp}^f$ is a rear spring-based normal force at the rear axle;
$F_{f,uncertainties}$ is half-car model uncertainties force at the front axle;
$F_{zaero}^f$ is a front downforce;
$F_{zaero}^r$ is a rear downforce;
$I_{yy}$ is an inertia of the vehicle;
$\ddot{\theta}$ is a rate of change of a rate of change of a pitch angle;
$L_f$ is a distance from a center of gravity of the vehicle to the front axle;
$L_r$ is a distance from a center of gravity of the vehicle to the rear axle;
$L_{DF}^r$ is a distance from a center of gravity of the vehicle to the first aerodynamic body;
$L_{DF}^f$ is a distance from a center of gravity of the vehicle to the second aerodynamic body;
$h_{pc,cg}$ is a road height; and
$a_x$ is a longitudinal acceleration of the vehicle.

11. The tangible, non-transitory, machine-readable medium of claim 9, wherein the half-car mode further uses a following equations:

$$F_{sp}^f = F_{f_0} + K_f z_f + C_f \dot{z}_f$$
$$F_{sp}^r = F_{r_0} + K_r z_r + C_r \dot{z}_r$$

where:
$F_{sp}^f$ is a front spring-based normal force at the front axle;
$F_{sp}^r$ is a rear spring-based normal force at the rear axle;
$F_{f_0}$ is a front preload;
$F_{r_0}$ is a rear preload;
$K_f$ is a spring constant of the suspension in the front axle;
$K_r$ is a spring constant of the suspension in the rear axle;
$z_f$ is a heave at the front axle;
$z_r$ is a heave at the rear axle;
$C_f$ is a front suspension damping rate;
$C_r$ is a rear suspension damping rate;
$\dot{z}_f$ is a rate of change of the heave at the front axle; and
$\dot{z}_r$ is a rate of change of the heave at the rear axle.

12. The tangible, non-transitory, machine-readable medium of claim 11, wherein the tangible, non-transitory, machine-readable medium further comprising machine-readable instructions, that when executed by the processor, causes the processor to use a Kalman filter to determine the downforce acting on the vehicle.

13. The tangible, non-transitory, machine-readable medium of claim 12, wherein the tangible, non-transitory, machine-readable medium further comprising machine-readable instructions, that when executed by the processor, causes the processor to develop the neural network to determine the half-car model uncertainties force at the front axle and the half-car model uncertainties force at the rear axle of the vehicle.

14. The tangible, non-transitory, machine-readable medium of claim 13, wherein the tangible, non-transitory, machine-readable medium further comprising machine-readable instructions, that when executed by the processor, causes the processor to train the neural network model by testing the vehicle on a road.

15. The tangible, non-transitory, machine-readable medium of claim 14, wherein the tangible, non-transitory, machine-readable medium further comprising machine-readable instructions, that when executed by the processor, causes the processor to train the neural network model by simulating the vehicle in a wind tunnel.

16. The tangible, non-transitory, machine-readable medium of claim 15, wherein the vehicle inputs include a longitudinal velocity of the vehicle, a lateral acceleration of the vehicle, and a longitudinal acceleration of the vehicle.

17. A vehicle, comprising:
a vehicle body;
a front axle coupled to the vehicle body;
a rear axle coupled to the vehicle body;
a plurality of sensors disposed within the vehicle body;
a first aerodynamic actuator coupled to the vehicle body, wherein the first aerodynamic actuator includes a first aerodynamic body movable relative to the vehicle body;
a second aerodynamic actuator coupled to the vehicle body, wherein the second aerodynamic actuator includes a second aerodynamic body movable relative to the vehicle body; and
a vehicle controller disposed within the vehicle body, wherein the vehicle controller is in communication with the plurality of sensors, and the vehicle controller is programmed to:
receive a plurality of vehicle inputs from a vehicle, wherein the plurality of vehicle inputs includes sensor data from a plurality of sensors of the vehicle;
determine a downforce acting on the vehicle, wherein determining the downforce acting on the vehicle includes:
determine a predicted half-car model uncertainties using a neural network including a rate limiting min/max logic to prevent an incorrect downforce estimation, the rate limiting min/max logic having rate limiting inputs comprising:
ride height measurement;
longitudinal velocity; and
positions of the first and second aerodynamic actuators;
determine a front normal force at the front axle and a rear normal force at the rear axle using the vehicle inputs, the predicted half-car model uncertainties, and a half-car model;
determine a first position of the first aerodynamic body relative to the vehicle body and a second position of the second aerodynamic body relative to the vehicle body based on the downforce acting on the vehicle;
command the first aerodynamic actuator to move the first aerodynamic body to the first position relative to the vehicle body; and
command the second aerodynamic actuator to move the second aerodynamic body to the second position relative to the vehicle body.

18. The vehicle of claim 17, wherein the half-car model includes a following equations:

$$M(\ddot{z} + g) = \left(F_{sp}^f + F_{f,uncertainties}\right) + \left(F_{sp}^r + F_{r,uncertainties}\right) - F_{zaero}^f - F_{zaero}^r$$

$$I_{yy}\ddot{\theta} = L_f\left(F_{sp}^f + F_{f,uncertainties}\right) - L_r\left(F_{sp}^r + F_{r,uncertainties}\right) - L_{DF}^f F_{zaero}^f + L_{DF}^r F_{zaero}^r - Mh_{pc,cg}a_x$$

where:
M is a mass of the vehicle;
g is a universal gravitational constant;
$\ddot{z}$ is a rate of change of a rate of change of a heave of the vehicle;
$F_{sp}^f$ is a front spring-based normal force at the front axle;
$F_{r,uncertanties}$ is car model uncertainties force at the rear axle;
$F_{sp}^r$ is a rear spring-based normal force at the rear axle;
$F_{f,uncertainties}$ is the half-car model uncertainties force at the front axle;
$F_{zaero}^f$ is a front downforce;
$F_{zaero}^r$ is a rear downforce;
$I_{yy}$ is a inertia of the vehicle;
$\ddot{\theta}$ is a rate of change of a rate of change of a pitch angle;
$L_f$ is a distance from a center of gravity of the vehicle to the front axle;
$L_r$ is a distance from a center of gravity of the vehicle to the rear axle;
$L_{DF}^r$ is a distance from a center of gravity of the vehicle to the first aerodynamic body;
$L_{DF}^f$ is a distance from a center of gravity of the vehicle to the second aerodynamic body;
$h_{pc,cg}$ is a road height; and
$a_x$ is a longitudinal acceleration of the vehicle.

19. The vehicle of claim 18, wherein the half-car mode further uses a following equations:

$$F_{sp}^f = F_{f_0} + K_f z_f + C_f \dot{z}_f$$

$$F_{sp}^r = F_{r_0} + K_r z_r + C_r \dot{z}_r$$

where:
$F_{sp}^f$ is the front spring-based normal force at the front axle;
$F_{sp}^r$ is the rear spring-based normal force at the rear axle;
$F_{f_0}$ is a front preload;
$F_{r_0}$ is a rear preload;
$K_f$ is a spring constant of the suspension in the front axle;
$K_r$ is a spring constant of the suspension in the rear axle;
$z_f$ is a heave at the front axle;
$z_r$ is a heave at the rear axle;
$C_f$ is a front suspension damping rate;
$C_r$ is a rear suspension damping rate;
$\dot{z}_f$ is a rate of change of a heave at the front axle; and
$\dot{z}_r$ is a rate of change of a heave at the rear axle.

20. The vehicle of claim 19, wherein the vehicle controller is programmed to use a Kalman filter to determine the downforce acting on the vehicle.

* * * * *